(12) United States Patent
Nyerges et al.

(10) Patent No.: US 10,601,698 B2
(45) Date of Patent: Mar. 24, 2020

(54) TECHNIQUES FOR MANAGING TELEMETRY DATA FOR CONTENT DELIVERY AND/OR DATA TRANSFER NETWORKS

(71) Applicant: Ustream, Inc., San Francisco, CA (US)

(72) Inventors: Gábor Nyerges, Veresegyház/Pest (HU); József Tamás Ecsédi, Szenes/Csongrád (HU)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 15/018,134

(22) Filed: Feb. 8, 2016

(65) Prior Publication Data

US 2016/0234087 A1 Aug. 11, 2016

Related U.S. Application Data

(60) Provisional application No. 62/112,913, filed on Feb. 6, 2015.

(51) Int. Cl.
*H04L 12/751* (2013.01)
*H04Q 9/00* (2006.01)
*H04L 12/26* (2006.01)

(52) U.S. Cl.
CPC .............. *H04L 45/02* (2013.01); *H04L 43/12* (2013.01); *H04Q 9/00* (2013.01); *H04Q 2209/826* (2013.01)

(58) Field of Classification Search
CPC ...................................... H04L 45/02
USPC ........................................................ 709/203
See application file for complete search history.

(56) References Cited

U.S. PATENT DOCUMENTS

| | | | | |
|---|---|---|---|---|
| 5,793,966 A * | 8/1998 | Amstein | ............... | G06F 16/958 709/203 |
| 7,006,820 B1 * | 2/2006 | Parker | ................... | H04M 3/247 455/414.1 |
| 7,155,321 B2 * | 12/2006 | Bromley | ................ | G07C 5/008 701/29.6 |
| 7,216,172 B2 * | 5/2007 | Yang | ....................... | H04L 67/02 709/203 |

(Continued)

OTHER PUBLICATIONS

Kim, "Internet-centric solution is more than moving online", Lexologgy, 2015 (Year: 2015).*

(Continued)

*Primary Examiner* — Ondrej C Vostal
(74) *Attorney, Agent, or Firm* — Schmeiser, Olsen & Watts, LLP; James Nock

(57) ABSTRACT

An application server associated with a content and/or data transfer network executes telemetry framework(s) to monitor telemetry data for client devices over communication networks. The application server instructs one or more client devices associated with the application server to generate telemetry data according to one or more parameters, monitors the telemetry data generated by the one or more client devices when the one or more client devices requests content from a content delivery network associated with the application server, determines a change in a value for the telemetry data, and stores the change in the value for the telemetry data keyed to the one or more parameters in a database.

15 Claims, 7 Drawing Sheets

(56) References Cited

U.S. PATENT DOCUMENTS

| | | | | |
|---|---|---|---|---|
| 8,432,887 | B1* | 4/2013 | Ding | H04B 7/2643 370/348 |
| 8,509,260 | B2* | 8/2013 | Koenck | G06F 15/0225 370/466 |
| 9,345,404 | B2* | 5/2016 | Proud | H02J 50/10 |
| 9,648,287 | B2* | 5/2017 | Carl | H04N 7/183 |
| 9,825,995 | B1* | 11/2017 | Schroeder | H04L 63/205 |
| 10,182,128 | B1* | 1/2019 | Allocca | H04L 67/2819 |
| 2003/0055965 | A1* | 3/2003 | Colby | H04L 29/06 709/225 |
| 2003/0088696 | A1* | 5/2003 | McCanne | H04L 12/1836 709/238 |
| 2004/0103144 | A1* | 5/2004 | Sallam | H04L 67/025 709/203 |
| 2005/0156735 | A1* | 7/2005 | Humphries | G06Q 10/08 340/539.13 |
| 2006/0221859 | A1* | 10/2006 | Bijwaard | H04L 45/02 370/254 |
| 2009/0055691 | A1* | 2/2009 | Ouksel | G01D 21/00 714/48 |
| 2010/0238801 | A1* | 9/2010 | Smith | H04L 45/00 370/229 |
| 2010/0331738 | A1* | 12/2010 | Stein | A61B 5/103 600/587 |
| 2011/0085548 | A1* | 4/2011 | Fernandez Gutierrez | H04L 12/18 370/390 |
| 2011/0282930 | A1* | 11/2011 | Bocirnea | G06F 19/327 709/203 |
| 2012/0163234 | A1* | 6/2012 | Sulc | H04L 61/35 370/254 |
| 2012/0277543 | A1* | 11/2012 | Homchowdhury | A61B 5/002 600/300 |
| 2012/0283580 | A1* | 11/2012 | Havel | A61B 5/0215 600/485 |
| 2012/0330123 | A1* | 12/2012 | Doerr | A61B 5/042 600/377 |
| 2013/0060929 | A1* | 3/2013 | Koponen | H04L 12/4633 709/224 |
| 2013/0204997 | A1* | 8/2013 | Eggleston | H04L 41/5009 709/223 |
| 2014/0067884 | A1* | 3/2014 | Tata | G06F 16/164 707/822 |
| 2014/0086122 | A1* | 3/2014 | Gupta | H04B 7/0632 370/311 |
| 2014/0164584 | A1* | 6/2014 | Joe | H04L 12/5689 709/223 |
| 2014/0187890 | A1* | 7/2014 | Mensinger | A61B 5/0004 600/365 |
| 2014/0247136 | A1* | 9/2014 | Proud | G08C 17/02 340/870.01 |
| 2014/0279707 | A1* | 9/2014 | Joshua | G06Q 30/0283 705/400 |
| 2014/0351227 | A1* | 11/2014 | Christodorescu | G06F 16/2455 707/692 |
| 2015/0062285 | A1* | 3/2015 | Xu | H04L 12/1822 348/14.08 |
| 2015/0113172 | A1* | 4/2015 | Johnson | H04L 67/34 709/245 |
| 2015/0304420 | A1* | 10/2015 | Li | H04L 67/1097 709/201 |
| 2016/0054788 | A1* | 2/2016 | Gulati | G06F 1/3296 713/323 |
| 2016/0142249 | A1* | 5/2016 | Wu | H04L 41/0806 709/222 |
| 2016/0204992 | A1* | 7/2016 | Wu | H04L 41/14 709/224 |
| 2016/0212007 | A1* | 7/2016 | Alatorre | G06F 9/5066 |
| 2016/0306824 | A1* | 10/2016 | Lopez | G06T 3/4092 |

OTHER PUBLICATIONS

Microsoft Computer Dictionary, "real-time", p. 441, 2002 (Year: 2002).*

Andrei Iancu, "Remarks by Director Iancu at the Intellectual Property Owners Association 46th Annual Meeting", Sep. 24, 2018, Chicago, Illinois, retrieved on Nov. 18, 2018 from the Internet: <https://www.uspto.gov/about-us/news-updates/remarks-director-iancu-intellectual-property-owners-46th-annual-meeting>, 7 pages.

* cited by examiner

500

| | | Playing | Buffering | Percent |
|---|---|---|---|---|
| ────── GLOBAL ────── | | | | |
| total | | 1596 | 52 | 3.26 |
| ────── MEDIA BY PLAYING ────── | | | | |
| | media (669) | Playing | Buffering | Percent |
| channel 1/1/237526 | | 81 | 0 | 0.00 |
| channel 1/1/4307895 | | 78 | 0 | 0.00 |
| channel 1/1/15134415 | | 56 | 4 | 7.14 |
| ────── MEDIA BY BUFFERING ────── | | | | |
| | media (153) | Playing | Buffering | Percent |
| channel 1/1/15660953 | | 11 | 4 | 36.36 |
| channel 1/1/15134415 | | 56 | 4 | 7.14 |
| channel 1/1/9531124 | | 9 | 3 | 33.33 |
| ────── COUNTRY BY PLAYING ────── | | | | |
| | country (87) | Playing | Buffering | Percent |
| Japan | | 601 | 14 | 2.33 |
| United States | | 276 | 2 | 0.72 |
| South Korea | | 174 | 3 | 1.72 |
| ────── COUNTRY BY BUFFERING ────── | | | | |
| | country (20) | Playing | Buffering | Percent |
| Philippines | | 59 | 14 | 27.12 |
| Japan | | 601 | 2 | 2.33 |
| Vietnam | | 15 | 3 | 20.00 |
| ────── AS BY PLAYING ────── | | | | |
| | as (684) | Playing | Buffering | Percent |
| AS4713 NTT Communication Corporation | | 128 | 1 | 0.78 |
| AS4755 Korea Telecom | | 101 | 1 | 0.99 |
| AS2516 KDDI KDDI Corporation | | 80 | 3 | 3.75 |
| ────── AS BY BUFFERING ────── | | | | |
| | as (87) | Playing | Buffering | Percent |
| AS9299 Philippine Long Distance Telephone Company | | 29 | 1 | 0.78 |
| AS6648 Bayan Telecommunication, Inc. | | 5 | 1 | 0.99 |
| AS2516 KDDI KDDI Corporation | | 80 | 3 | 3.75 |
| ────── CITY BY PLAYING ────── | | | | |
| | city (1292) | Playing | Buffering | Percent |
| Unknown | | 347 | 9 | 2.59 |
| Tokyo | | 221 | 3 | 1.36 |
| Seoul | | 50 | 0 | 0.00 |
| ────── CITY BY BUFFERING ────── | | | | |
| | city (127) | Playing | Buffering | Percent |
| Unknown | | 347 | 9 | 2.59 |
| Tokyo | | 221 | 3 | 1.36 |
| Ho Chi Minh City | | 10 | 3 | 30.00 |

FIG. 5

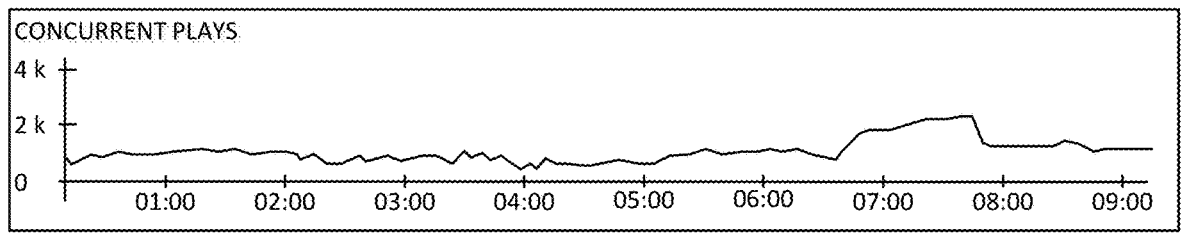
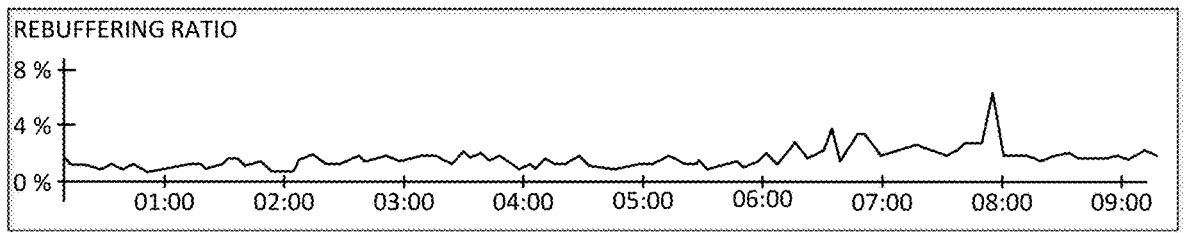
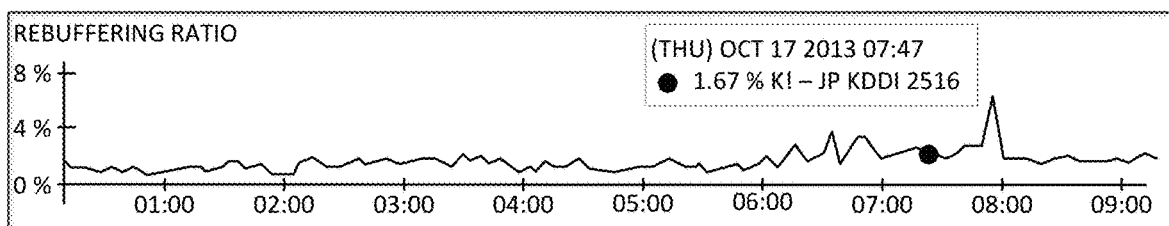
FIG. 6

TECHNIQUES FOR MANAGING TELEMETRY DATA FOR CONTENT DELIVERY AND/OR DATA TRANSFER NETWORKS

CROSS REFERENCE TO RELATED APPLICATIONS

This application claims priority to U.S. Provisional Patent Application Ser. No. 62/112,913, filed on Feb. 6, 2015, the content of which is herein incorporated by reference.

BACKGROUND

Field of the Disclosure

The present disclosure relates to content delivery over a distributed communication network, and more particularly, to managing content delivery over content delivery networks (CDNs).

Description of the Related Art

The Internet of today is an ever-changing environment, including for example, a variety of distributed systems of servers deployed in multiple data centers around the world (e.g., content delivery networks (CDNs)). Content providers use networks such as CDNs to meet ever increasing demand for digital content over communication networks. For example, CDNs can locally store and serve requested content to end users more efficiently than origin servers storing the same content.

In an effort to better manage, distribute, operate, and implement CDNs, CDN providers often collect and aggregate telemetry data from various network nodes and/or devices. However, the scale and complexity of CDNs often results in correspondingly a large and complex amount of telemetry data. Further, the amount of telemetry data is multiplied when a CDN network maintains a persistent, bidirectional connection to corresponding client devices since telemetry data is generated both "to" and "from" client device. Moreover, additional challenges arise when telemetry data is generated by different types of client devices, since each client device may generate a different type or format of telemetry data. Further complicating telemetry data collection is the inherent nature of a CDN environment which dynamically serves content, in real-time, to a constantly changing pool of requesting client devices.

Conventional telemetry data systems employed by content providers often include a separate architecture of devices, independent from underlying application servers that facilitate transfer of the content/data within a network. Such conventional telemetry data systems prove expensive, complex, and require a large amounts of computing resources to handle many chunks of telemetry data, configure heterogeneous telemetry data, and translate telemetry data collected by devices having different operating systems. Operatively, conventional telemetry data systems may manage telemetry data by collecting and parsing logs of telemetry data, which may require several parsing steps to transform telemetry data into a human-readable form. Further, some parsing steps can include recording a measurement for each tracked variable from a beginning of the log or from a last measurement and comparing a current measurement against the recorded measurement to determine a delta or changed state. Typically, the entire log, including recorded measurements, and changed states are stored for verification and later comparisons. Accordingly, real-time data management by conventional telemetry data systems often proves difficult, at best.

SUMMARY

The present disclosure provides techniques for collecting, transforming and aggregating, in real-time, telemetry data relating to large-scale content and/or data transfers to and from a constantly-changing multitude of heterogeneous client devices connected to one or more content and/or data transfer networks (e.g., CDNs). These techniques typically employ a simple data storage device to store telemetry data and provide flexible configurations to collect, transform, and aggregate telemetry data in real-time.

For example, according to one embodiment, telemetry management techniques and/or telemetry systems employing the same, can include one or more software frameworks (e.g., modules, etc.), referred to as telemetry frameworks, incorporated within respective application servers in content/data transfer networks. The telemetry framework collects and stores telemetry data generated from an exchange of content and/or data to requesting devices (e.g., client devices). In particular, the telemetry frameworks collect heterogeneous chunks of telemetry data from various client devices and transform the telemetry data into key-value pairs. Such telemetry frameworks support efficient real-time data collection using minimal storage space. In some embodiments, the telemetry frameworks transform telemetry data into key-value pairs within corresponding application servers and, optionally, the telemetry frameworks can support real-time configuration for telemetry data collection, transformation and aggregation using Application Programming Interface (API) calls between the telemetry frameworks and a graphical user interface (e.g., a visualization and control interface).

According to another example embodiment, an application server associated with a content and/or data transfer network executes one or more software defined framework which monitor telemetry data for client devices over communication networks. The application server instructs one or more client devices associated with an application server to generate telemetry data according to one or more parameters, and monitors the telemetry data generated by the one or more client devices when the one or more client devices requests content from a content delivery network associated with the application server. The application server further determines one or more changed values for the telemetry data generated by the one or more client devices, and stores such changed values for the telemetry data in a database keyed to the one or more parameters (e.g., a key-value pair). With respect to the one or more parameters, the application server can define a distribution tree that includes the one or more parameters. Accordingly, when the application server instructs the one or more client devices, the application server further instructs the one or more client devices to generate the telemetry data according to the distribution tree.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject invention without undue experimentation, preferred embodiments thereof will be described in detail herein below with reference to certain figures, wherein:

FIG. 5 illustrates an example real-time report, showing telemetry data organized according to parameters and corresponding values;

FIG. 6 illustrates additional real-time reports, showing telemetry data organized according to parameters and time;

A component or a feature that is common to more than one drawing is indicated with the same reference number in each of the drawings.

DESCRIPTION OF EXAMPLE EMBODIMENTS

The subject disclosure addresses these above-described problems implementing a software framework—preferably, integrated with application servers of the CDNs. For purposes of discussion here, the term software framework is used interchangeably with a telemetry framework. Notably, the telemetry framework may be shown as a separate layer outside of certain communication networks, however, it is to be understood that such telemetry framework is readily integrated in application servers/devices.

Figure 1:
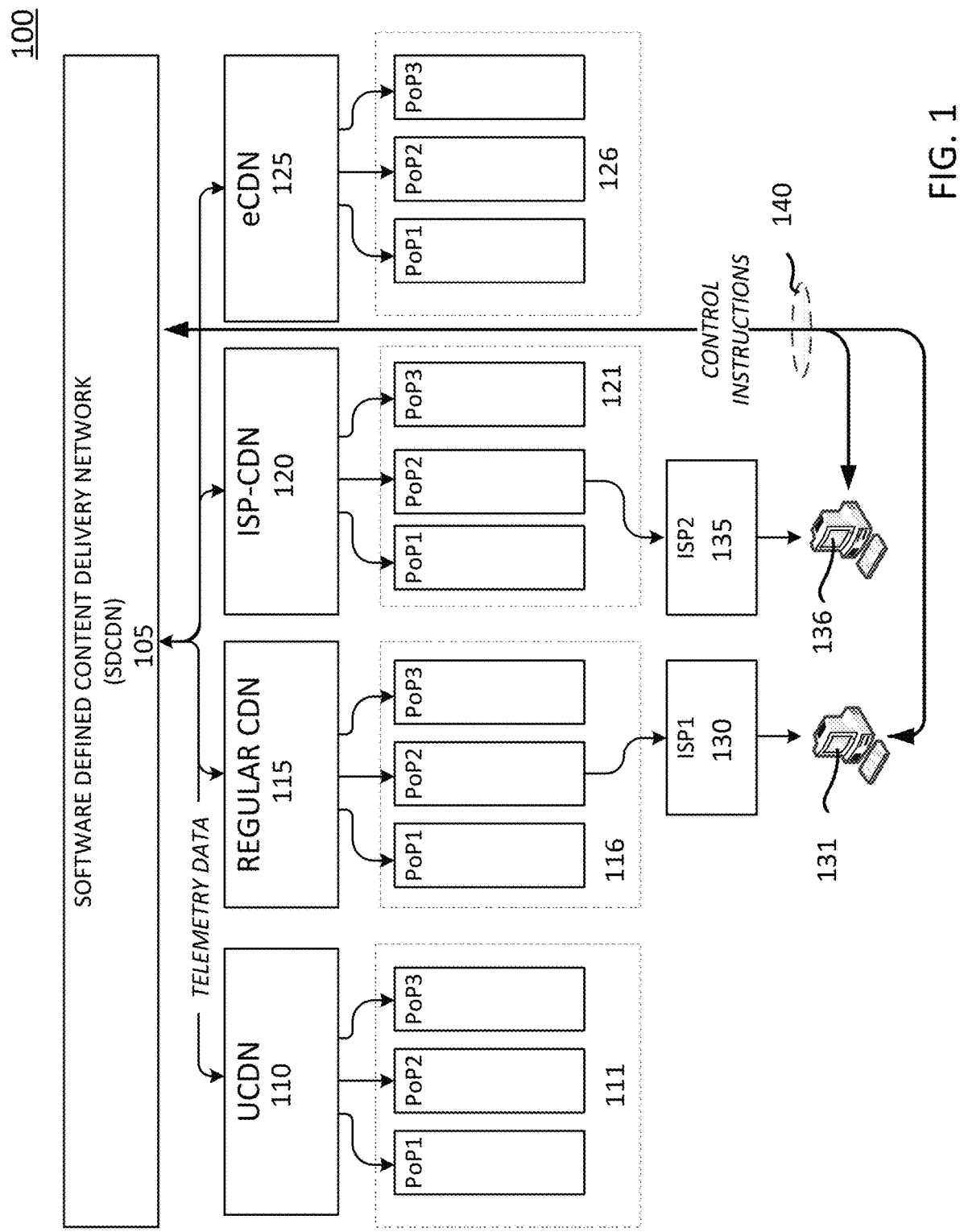
FIG. 1 illustrates an example communication network.

Referring now to the drawings, FIG. 1 illustrates an example communication network 100, including a telemetry framework represented by a software layer 105 (e.g., labeled "Software Defined Content Delivery Network (SDCDN)"). Communication network 100 illustratively shows a geographically distributed collection of sub-networks, including various Content Delivery Networks (CDNs) (e.g., UCDN 110, Regular CDN 115, ISP-CDN 120, and eCDN 125), corresponding point of presence (PoP) servers (e.g., POPs 111, POPs 116, POPs 121, and POPs 126), Internet service provider (ISP) networks (e.g., ISP 130 and ISP 135), and client devices (e.g., client device 131, and client device 136).

The client devices, POP servers, CDNs, and SDCDN are interconnected by communication links and segments for transporting data between content providers and corresponding network devices. Many types of networks are available (e.g., ranging from local area networks (LANs) to wide area networks (WANs)), and many types of communication links are available as well (e.g., wired, wireless, etc.). Further, the various communication links and corresponding network devices can support many methods of communication. Those skilled in the art will understand that any number of devices, networks, links, etc. may be used in communication network 100, and that the view shown herein is for simplicity. Further, each of the sub-networks can include any number of devices or nodes (e.g., switches, routers, etc.), as appropriate.

As discussed above, the telemetry system can include a telemetry framework (e.g., modules, etc.) incorporated within application servers for content and/or data transfer networks. As shown, such integrated telemetry frameworks are represented as a collective software layer SDCDN 105.

These telemetry frameworks, e.g., SDCDN 105, communicate with corresponding client devices 131 and 136 using a communication channel 140. For example, as discussed in U.S. Patent Application No. 2013/0054743, the entirety of which is incorporated by reference herein, the communication channel 140 can include a bi-directional connection or channel between SDCDN 105 and corresponding client devices. This bi-directional connection, in certain embodiments, may be a separate channel from content data streams (e.g., a multimedia data stream). Operatively, the bi-directional connection facilitates an exchange between each client device and SDCDN 105, including for example, operational data, performance data, control messages, and the like.

Figure 2:
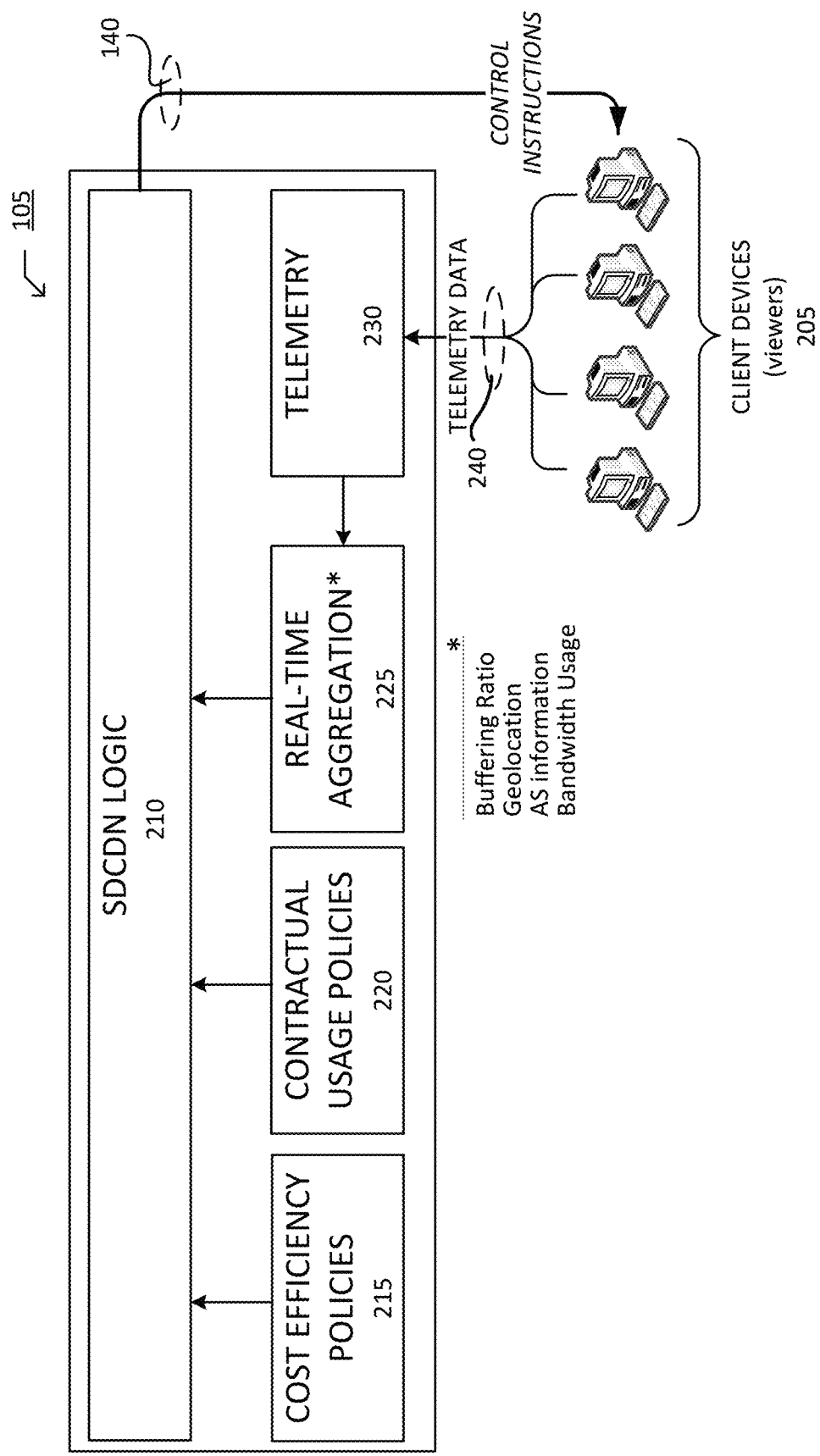
FIG. 2 illustrates an example software defined content delivery network (SDCDN) device.

FIG. 2 illustrates a schematic block diagram of one exemplary telemetry framework for SDCDN 105. As discussed, SDCDN 105 communicates with client devices—here, client devices 205—using a communication channel 140. While, in certain embodiments, communication channel 140 may include a single bi-directional connection, other embodiments may include two (or more) communication channels. For example, still referring to FIG. 2, a bi-directional channel can be formed from communication channel 140 and an additional communication channel 240. In this example configuration, SDCDN 105 issues control instructions to client devices 205 using channel 140 and receives telemetry data regarding content delivery using communication channel 240. As shown, a telemetry module 230 receives telemetry data over communication channel 240 and a real-time aggregation module 225 monitors and analyzes the telemetry data received by telemetry module 230.

As shown, SDCDN 105 also includes a SDCDN logic module 210, which employs telemetry data management techniques described herein. In employing such telemetry data management techniques, SDCDN logic module 210 analyzes telemetry data as well as additional data from a cost efficiency policy module 215, a contractual usage policy module 220, and a real-time aggregation module 225 (e.g., including buffering ratio, geolocation, AS information, bandwidth use, etc.).

Figure 3:
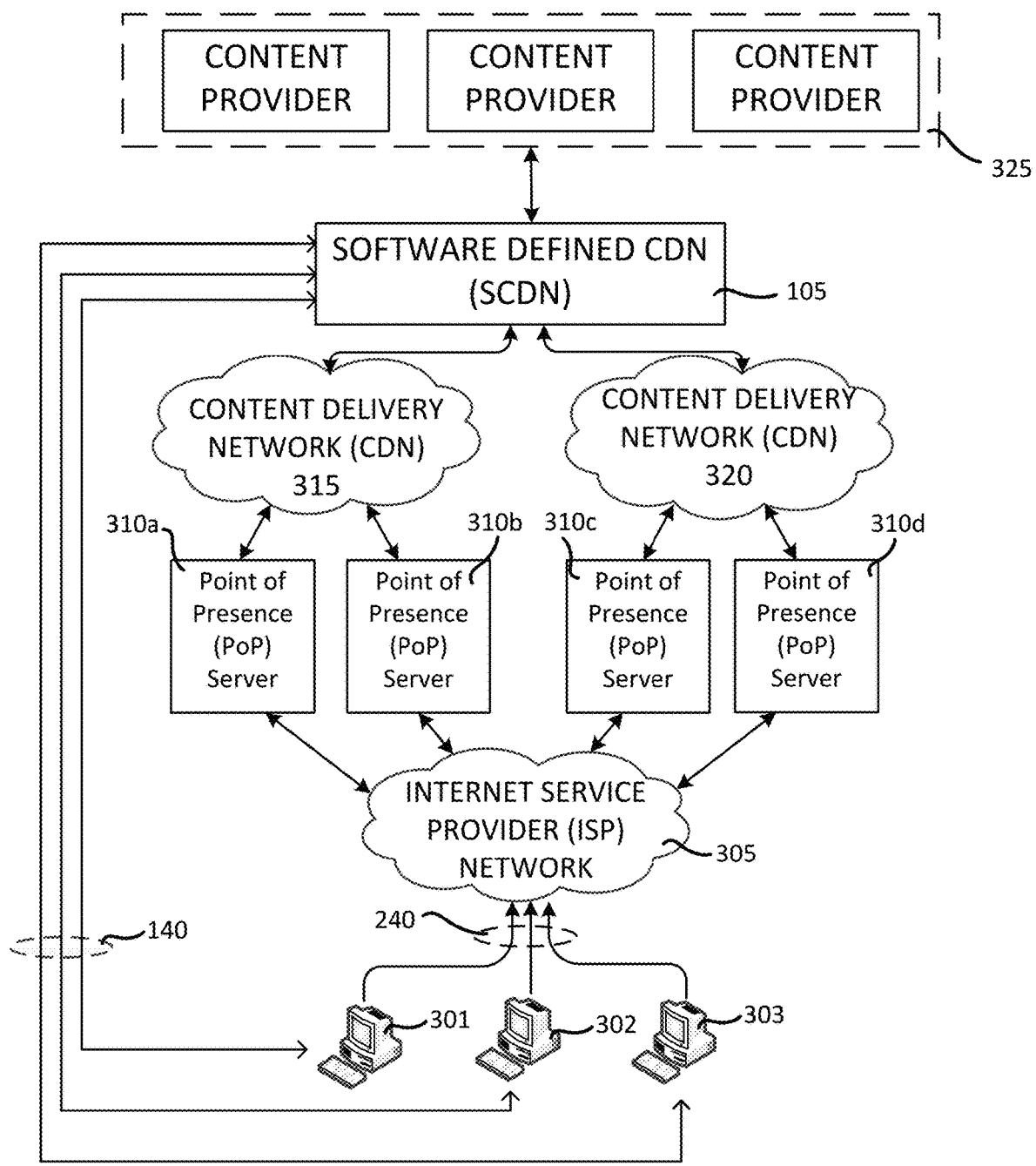
FIG. 3 illustrates another example view of the communication network.

FIG. 3 illustrates a communication network 300. Network 300, similar to network 100, includes various client devices 301, 302, 303, an Internet Service Provider (ISP) network 305, various Point of Presence (PoP) servers 310a, 310b, 310c, and 310d, Content Delivery Networks 315 and 320, SDCDN 105, and content providers 325.

Operatively, content providers 325 (e.g., media companies, e-commerce vendors, etc.) contract with CDN provider (e.g., CDN 315 and 320) to deliver content to a requesting end-user (e.g., client devices 301, 302, and 303). The CDN provider(s), in turn, contracts with one or more ISPs (e.g., ISP 305), carriers, and network operators to host its servers in their data centers. As discussed above, CDNs are a valuable resource for content providers and operatively improve content/data delivery, increase an availability for content, offload network traffic served directly from the content provider's infrastructure, and the like.

A request for content or data from client devices 301, 302, and 303 is typically directed in an "optimal" fashion to an appropriate CDN (or content provider) through various network nodes/devices. An optimal path to an appropriate CDN (or content provider) may be determined, for example, by a fewest number of hops between a requesting client device and a CDN, a lower network latency or response time between a requesting client device and a CDN, and the like.

It is appreciated that determining an optimal path can prioritize various metrics for content delivery. For example, even though a client device or destination node may be physically/geographically closest to a CDN or source node, network latency (e.g., in network seconds) can be high. Similarly, a client device may be located at a fewest number of hops from a CDN (e.g., in close network proximity), but the client device may be physically located far (geo-proximity) from the CDN, which can also result in a high network latency. Additional optimal metrics can include an availability of the CDN in terms of server performance (both current and historical), so as to optimize delivery across local networks. Alternatively, optimal paths can be measured by a cost metric, whereby certain locations and/or paths may be less expensive to serve content. Preferably, these various metrics are balanced to provide optimal performance for content delivery to client devices.

Still referring to FIG. 3, PoPs 310a-310d, sometimes referred to as "edges" or "edge network nodes/devices", facilitate content transfer from CDNs 315 and 320 to ISP 305. Notably, PoPs typically represent the closest "edge" from the perspective of an end-user or client device relative to CDN assets or content. CDNs 315 and 320 provide services to corresponding POPs depending on, for example, geographic coverage.

Operatively, a requesting client device, for example client device 301, requests content from one of content providers 325. The content request may be directed to a local CDN, such as CDN 315. As is appreciated by those skilled in the art, a content request is typically routed to CDN 315 through ISP networks, POPs, and the like. Various other network devices or nodes (not shown) also facilitate this process.

CDN 315 receives the content request from client device 301 and, in response, provides content corresponding to the content request to client device 301. Client device 301 further generates telemetry data (e.g., "chunks" or fragments of information typically used in multimedia formats) during this exchange. Such telemetry data is monitored by SDCDN 105. For example, SDCDN 105 monitors telemetry data including, but not limited to, client and/or CDN status, geographic location, content delivery information, network traffic congestion, cost, bandwidth, efficiency, load-balancing, usage, latency, jitter, and the like, over communication channel 140 and/or communication channel 240. As discussed above, SDCDN 105 represents one or more telemetry frameworks or modules which are preferably incorporated within application servers in content and/or data transfer networks and manages/monitors telemetry data generated by client devices.

Figure 4:
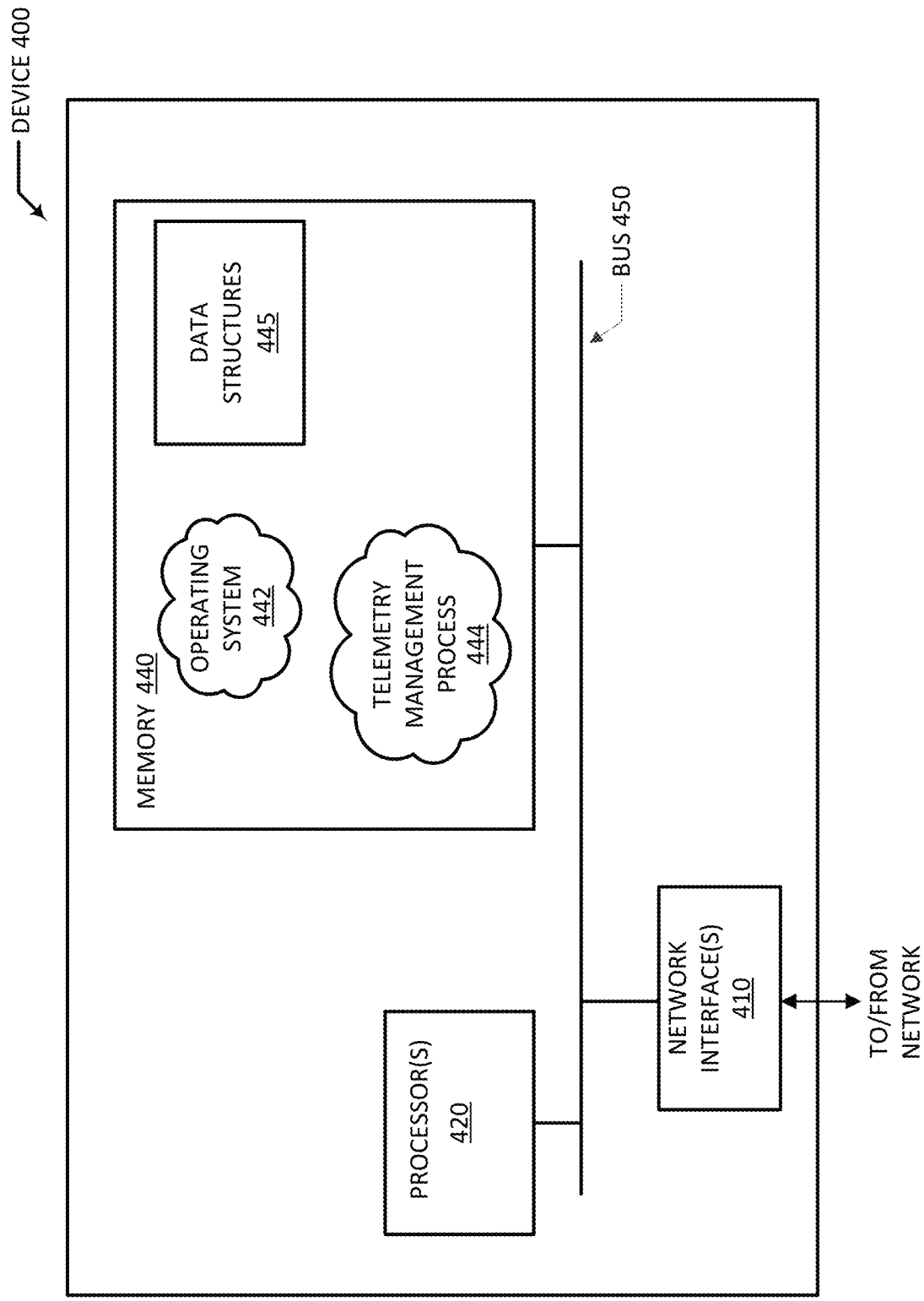
FIG. 4 illustrates an example node/device in the communication network shown in FIG. 3.

FIG. 4 illustrates an example node/device 400 that may be used with one or more embodiments described herein (e.g., a device employing telemetry management techniques/processes). For example, node/device 400 may represent a server that executes one or more frameworks or modules of SDCDN 105.

As shown, device 400 may comprise one or more network interfaces 410, at least one processor 420 (e.g., a hardware controller/processor), and a memory 440 interconnected by a system bus 450.

The network interface(s) 410 contain the mechanical, electrical, and signaling circuitry for communicating data over physical and/or wireless links coupled to the SDCDN 105. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, Real Time Messaging Protocols (RTMP), a Real Time Streaming Protocols (RTSP), a Hypertext Transfer Protocols (HTTP), and HTTP Live Streaming (HLS) Protocols, etc.

The memory 440 comprises a plurality of storage locations that are addressable by the processor 420 and the network interfaces 410 for storing software programs and data structures associated with the embodiments described herein. Certain embodiments of device 400 may include limited memory or no memory (e.g., no memory for storage other than for programs/processes operating on the device 400). The processor 420 may comprise necessary elements or logic adapted to execute the software programs and manipulate data structures 445.

An operating system 442, portions of which are typically resident in memory 440 and executed by the processor, functionally organizes the device by, inter alia, invoking operations in support of software processes and/or services executing on the device. For example, these software processes and/or services may comprise telemetry management process/services 444. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the telemetry management process 444, which may contain computer executable instructions executed by the processor 420 (or independent processor of interfaces 410) to perform functions relating to the techniques described herein. The telemetry management process 444 provides standard software frameworks (e.g., modules) included in the telemetry framework discussed herein. The telemetry management process 444 and/or the telemetry framework(s) are typically incorporated into application servers/devices in content and/or data transfer networks. These telemetry frameworks, in each server/device, can independently collect and aggregate chunks of telemetry data related to content and/or data transfers to/from corresponding client devices.

More specifically, telemetry management process 444, when employed by device 400, operatively manages telemetry data regarding content exchanged between a CDN and a corresponding client device. For example, as discussed in greater detail below, telemetry management process 444 may be integrated in application servers/devices in a CDN, and (when executed) causes such application servers/devices to collect telemetry data from a client device according to a distribution hierarchy or distribution tree and stores such telemetry data in a memory (e.g., memory 440 or other separate database) for subsequent analysis, aggregation, and the like.

Further, telemetry management process 444 can further automatically collect telemetry data from client devices connected to an application server at specific time intervals. In some embodiments, one or more of the application servers may update or request a modification to the telemetry data it collects. In such embodiments, a group notification may be sent to all or a specific subgroup of devices connected to a corresponding application server in order to change the telemetry data collected.

Collecting and/or processing telemetry data according to specific time intervals provides flexible data granulation that can be adjusted according to business needs and available computing resources. Such adjustment can be made by an operator or administrator for the telemetry framework. For example, the operator or administrator can initiate an adjustment using a graphical user interface (e.g., a visualization and control interface) and further executing an Application Programming Interface (API) call. In turn, telemetry management process 444 can send an appropriate control instruction to a specified set of clients, which start collecting and sending telemetry data. The telemetry management process 444 may further process the data and/or send the data to a display interface where an administrator or operator can view the resulting data. All of the foregoing occurs in real-time.

For example, FIG. 5 illustrates a real-time visualization report 500, showing a breakdown of telemetry data for "media by playing, "media by buffering, "country by playing", "country by buffering", "AS by playing", "AS by buffering", "city by playing", and "city by buffering". As shown, visualization report 500 provides an overview of telemetry data as well as telemetry data for a particular channel/CDN, etc.

In some embodiments, high level telemetry data may be further filtered by specific visualizations, as shown in FIG. 6. In particular, FIG. 6 illustrates visualization real-time reports 601, 602, and 603 which represent telemetry data (e.g., concurrent plays and buffering ratios) over a specified time period.

Figures 7, 8:
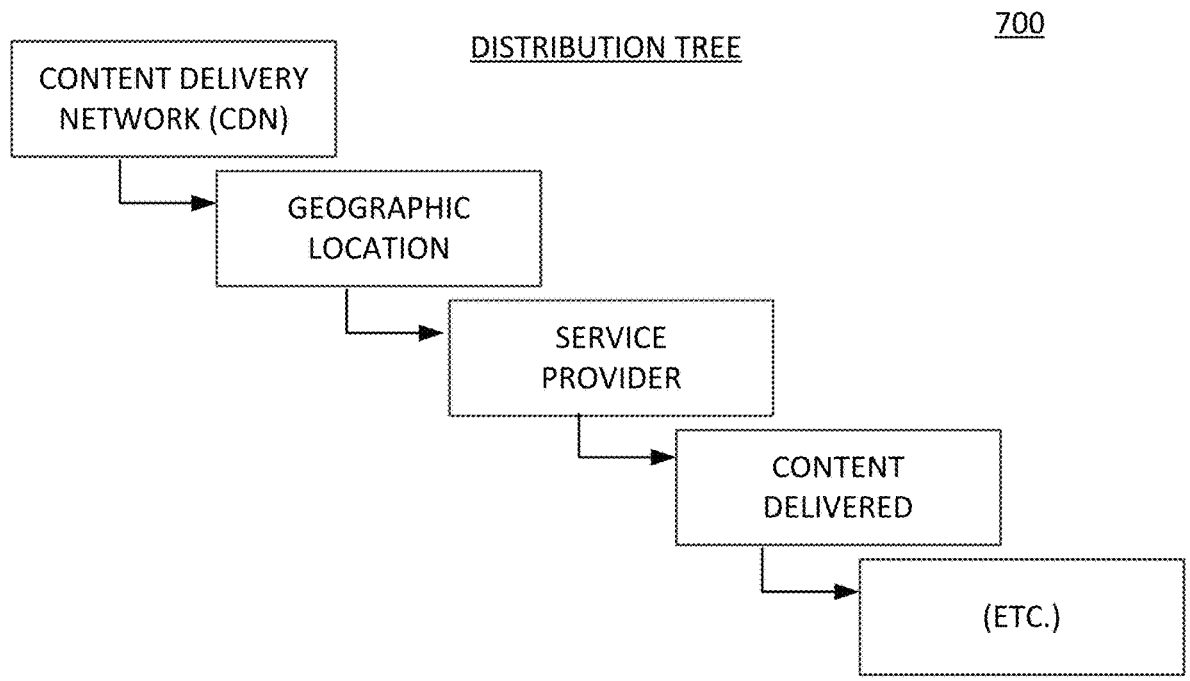
FIG. 7 illustrates an example distribution tree, showing a hierarchy of parameters for managing telemetric data.
FIG. 8 illustrates an example key-value pair table, showing parameter queries and corresponding values.

With respect to aggregating collected telemetry data, telemetry management process 444 and/or a telemetry framework may employ one or more configuration hierarchies or distribution trees, shown in FIG. 7. In particular, FIG. 7 provides an exemplary distribution tree 700, including parameters for telemetry data collection from requesting client devices. Such parameters can include, for example, a CDN, a geographic location, a service provider, a content delivered, and the like.

Typically, each application server includes the telemetry framework, which collects telemetry data for corresponding client devices and aggregates, in real-time, the telemetry data using a distribution tree. A distribution tree holds the parameters based on which data aggregation is calculated where every branch acts as a new subset. The parameters can further include a Channel, AS information, a Country (country of viewers), as well as corresponding metrics such as viewers (e.g., client devices) watching, a unique viewer, a peak amount of concurrent viewers, viewer hours, bandwidth consumed (per viewer/sub-set of viewers/total/etc.), buffering, and the like. Notably, the distribution tree can be modified—e.g., branches added or removed—in real-time using, for example, Application Programming Interface (API) calls, and data aggregation follows suit.

An example of data collection and aggregation (in the context of video streaming), a configuration tree can collect telemetry data for clients currently in a state of playing a video stream. The telemetry data can be filtered based on a geolocation, and further filtered by a corresponding application server (content delivery network) serving the video stream. The configuration tree may also be modified in real-time—e.g., a new marketing or training tracking code can be introduced to certain live multimedia content. In such environment, the telemetry framework may send an update to clients connected to application servers with a particular tracking code at the same time the code is introduced in order to collect telemetry data associated with the tracking code in real-time.

The telemetry framework may also facilitate real-time content delivery such as live or on-demand video streams (and related data transfers, including associated commentary, questions, approval/disapproval, rating, viewing, and sharing information). In such environment, the telemetry framework can monitor telemetry data, including a real-time number of simultaneous viewers, a streaming quality (buffering) and real-time viewer demographics. Based on this telemetry data, the telemetry framework may direct network routing to improve content delivery to viewers while also balancing one or more cost metrics (e.g., a provider's cost, network resource usage, etc.). Further, such telemetry data may also indicate the popularity and/or efficacy of marketing and/or training content.

Each telemetry framework may also perform calculations of changed states (e.g., delta(s)) from measurements of tracked variables of telemetry data within the particular application server where it resides. Each telemetry framework additionally stores the results of such calculations, along with the entire log of telemetry data for variables, at which log points and what variables were measured, and all the measurements, for later comparisons.

The raw telemetry data collected is also transformed by each telemetry framework into key-value pairs, an example of which is illustrated in FIG. 8. For example, FIG. 8 provides table 800 for key-value pairs, including specific parameters for the "key", e.g., distribution tree parameters, and a corresponding "value", which is an updated delta value (from the prior stored value). The key-value pairs can be stored at any commercially available, minimally-configured key-value pair data storage attached to the one or more content and/or data transfer networks. There is no configuration requirement for the data storage device relating to collection, aggregation, or transformation. The primary configuration requirement of the attached data storage is to provide high availability, scalability and as low response time as possible. By nature of the transformed data, only a small amount needs to be stored and only the application server-level aggregation is required from the storage itself.

In addition, the key component of a key-value pair provides a vehicle to modify distribution tree 700. In particular, an application server, executing the telemetry framework, can receive queries indicating a "key"—e.g., collect data for a particular "CDN", at a given "geographic location", for a set of "viewers". In response, the application server can instruct associated client devices to generate telemetry data values for the "key".

When providing real-time telemetry data, the telemetry framework discussed herein particularly aggregates changes or a delta from the previous state, as discussed above. For example, the key-value pair "value" can simply include an update to the prior delta. These deltas (or changes from the last saved state) may be stored in memory of the application server according to a respective key. In this fashion, the actual data is very easily calculated by simple arithmetic without the need for multi-step parsing techniques employed by conventional telemetry systems. Notably, in some embodiments, the key-value pair may be encrypted using various techniques known to those skilled in the art (e.g., hash functions, etc.).

Further, in certain embodiments, the aggregated data stored by the telemetry frameworks may optionally be requested by a visualization and control interface (outside the application servers) via standard Application Programming Interface (API) calls. Modification of the configuration tree is similarly done and the modified telemetry data is available real-time as well.

The techniques described herein, therefore, provide for managing telemetry data for client devices for content and/or data transfer networks, including CDNs. These techniques provide for simplified, but efficient telemetry data collection according to distribution trees (e.g., user defined queries), and storing delta or changed values. Such techniques can be employed by, for example, various telemetry frameworks incorporated into application servers associated with content and/or data transfer networks.

While there have been shown and described illustrative embodiments for managing telemetry data, it is to be understood that various other adaptations and modifications may be made within the spirit and scope of the embodiments herein. For example, the embodiments have been shown and described herein with relation to particular CDNs, ISP networks, etc. However, the embodiments in their broader sense are not as limited, and may, in fact, be used with any number of networks, client devices, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for monitoring, and efficiently storing, real-time telemetry data over a communication network, said method comprising:
instructing, by an application server executing a telemetry framework, one or more client devices to generate real-time telemetry data according to a distribution tree that includes one or more parameters;
monitoring, by the application server in accordance with the distribution tree, the real-time telemetry data generated by the one or more client devices when the one or more client devices requests content from a content delivery network associated with the application server, said monitoring comprising collecting in accordance with the distribution tree the real-time telemetry data generated by the one or more client devices;
determining, by the application server, a change in a value of the telemetry data generated by the one or more client devices;
storing, in a database by the application server, the change in the value of the telemetry data keyed to the one or more parameters;
transforming, by the application server, the collected real-time data into transformed data comprising key-value pairs, said transformed data configured to be efficiently stored using minimal storage space to provide high availability, scalability and low response time for the collected real-time data, which supports efficient real-time data collection;
storing, by the application server, the transformed data in the minimal storage space;
using a key component of a key-value pair of the transformed data to modify the distribution tree;
directing, by the application server, real-time delivery of data content via one or more routes over the communication network to the one or more client devices that request the data content from the content delivery network associated with the application server, said data content based on (i) modified telemetry data generated in accordance with the modified distribution tree and (ii) a cost metric; and
repeating, in accordance with the modified distribution tree, said monitoring, said determining a change, said storing the change, said transforming, said storing the transformed data, said using a key component, and said directing real-time delivery of data content.

2. The method of claim 1, wherein the telemetry framework includes a distribution tree indicating the one or more telemetry parameters.

3. The method of claim 1, further comprising:
establishing a bi-directional communication channel between the application server executing the telemetry framework and each client device that requests content from the content delivery network associated with the application server.

4. The method of claim 1, further comprising:
identifying, by the application server, a sub-group of client devices from the one or more client devices; and
transmitting, by the application server, a group notification to the sub-group of client devices to cause the sub-group of client devices to modify the real-time telemetry data generated when the sub-group of client devices request content from the content delivery network associated with the application server.

5. The method of claim 1, wherein monitoring the real-time telemetry data further comprises:

receiving, by the application server, an application programming interface call that indicates a time interval to collect real-time telemetry data; and
monitoring the real-time telemetry data according to the time interval.

6. A telemetry monitoring device, comprising:
one or more network interfaces adapted to communicate in a communication network;
a processor adapted to execute one or more processes; and
a memory configured to store a process executable by the processor, the process when executed operable to:
  instruct one or more client devices associated with telemetry monitoring device to generate real-time telemetry data according to a distribution tree that includes one or more parameters;
  monitor in accordance with the distribution tree the real-time telemetry data generated by the one or more client devices when the one or more client devices requests content from a content delivery network associated with the telemetry monitoring device, wherein to monitor the real-time telemetry data comprises to collect in accordance with the distribution tree the real-time telemetry data generated by the one or more client devices;
  determine a change in a value of the telemetry data generated by the one or more client devices;
  store, in the memory, the change in the value of the telemetry data keyed to the one or more parameters;
  transform the collected real-time data into transformed data comprising key-value pairs, said transformed data configured to be efficiently stored using minimal storage space to provide high availability, scalability and low response time for the collected real-time data, which supports efficient real-time data collection;
  store, the transformed data in the minimal storage space;
  use a key component of a key-value pair of the transformed data to modify the distribution tree;
  direct real-time delivery of data content via one or more routes over the communication network to the one or more client devices that request the data content from the content delivery network associated with the application server, said data content based on (i) modified telemetry data generated in accordance with the modified distribution tree and (ii) a cost metric; and
  repeat, in accordance with the modified distribution tree, said to monitor, said to determine a change, said to store the change, said to transform, said to store the transformed data, said to use a key component, and said to direct real-time delivery of data content.

7. The telemetry monitoring device of claim 6, wherein the process, when executed by the processor, further causes the processor to:
  receive an application programming interface call that includes a distribution tree, the distribution tree indicates the one or more telemetry parameters.

8. The telemetry monitoring device of claim 6, wherein the process, when executed by the processor, further causes the processor to:
  instruct the one or more client devices to generate the real-time telemetry data over a bi-directional communication channel; and
  receive the real-time telemetry data generated by the one or more client devices over the bi-directional communication channel.

9. The telemetry monitoring device of claim 6, wherein the process, when executed by the processor, further causes the processor to:
  identify a sub-group of client devices from the one or more client devices; and
  transmit, by the application server, a group notification to the sub-group of client devices to cause the sub-group of client devices to modify the telemetry data generated when the sub-group of client devices request content from the content delivery network associated with the telemetry monitoring device.

10. The telemetry monitoring device of claim 6, wherein the telemetry monitoring device is an application server.

11. The telemetry monitoring device of claim 6, wherein the process, when executed by the processor, further causes the processor to:
  receive an application programming interface call that indicates a time interval to collect real-time telemetry data; and
  monitor the real-time telemetry data according to the time interval.

12. A tangible, non-transitory, computer-readable media having a telemetry framework encoded thereon, the telemetry framework, when executed by a processor of an application server in a content delivery network, causes the application server to:
  instruct one or more client devices associated with the application server to generate real-time telemetry data according to a distribution tree that includes one or more parameters;
  monitor in accordance with the distribution tree the real-time telemetry data generated by the one or more client devices when the one or more client devices requests content from the content delivery network, wherein to monitor the real-time telemetry data comprises to collect in accordance with the distribution tree the real-time telemetry data generated by the one or more client devices;
  determine a change in a value of the telemetry data generated by the one or more client devices;
  store, in a database, the change in the value of the telemetry data keyed to the one or more parameters;
  transform the collected real-time data into transformed data comprising key-value pairs, said transformed data configured to be efficiently stored using minimal storage space to provide high availability, scalability and low response time for the collected real-time data, which supports efficient real-time data collection;
  store the transformed data in the minimal storage space;
  using a key component of a key-value pair of the transformed data to modify the distribution tree;
  direct real-time delivery of data content via one or more routes over the communication network to the one or more client devices that request the data content from the content delivery network associated with the application server, said data content based on (i) modified telemetry data generated in accordance with the modified distribution tree and (ii) a cost metric; and
  repeat, in accordance with the modified distribution tree, said to monitor, said to determine a change, said to store the change, said to transform, said to store the transformed data, said to use a key component, and said to direct real-time delivery of data content.

13. The tangible, non-transitory, computer-readable media of claim 12, wherein the telemetry framework, when executed by the processor of the application server, further causes the application server to:

receive an application programming interface call that includes a distribution tree, the distribution tree indicates the one or more telemetry parameters.

14. The tangible, non-transitory, computer-readable media of claim 12, wherein the telemetry framework, when executed by the processor of the application server, further causes the application server to:

instruct the one or more client devices to generate the real-time telemetry data over a bi-directional communication channel; and receive the real-time telemetry data generated by the one or more client devices over the bi-directional communication channel.

15. The tangible, non-transitory, computer-readable media of claim 12, wherein the telemetry framework, when executed by the processor of the application server, further causes the application server to:

identify a sub-group of client devices from the one or more client devices; and transmit, by the application server, a group notification to the sub-group of client devices to cause the sub-group of client devices to modify the telemetry data generated when the sub-group of client devices request content from the content delivery network associated with the telemetry monitoring device.

* * * * *